US006964032B2

(12) United States Patent
Liebmann et al.

(10) Patent No.: US 6,964,032 B2
(45) Date of Patent: Nov. 8, 2005

(54) PITCH-BASED SUBRESOLUTION ASSIST FEATURE DESIGN

(75) Inventors: Lars W. Liebmann, Poughquag, NY (US); Allen H. Gabor, Katonah, NY (US); Ronald L. Gordon, Poughkeepsie, NY (US); Carlos A. Fonseca, Staten Island, NY (US); Martin Burkhardt, White Plains, NY (US)

(73) Assignee: International Business Machines Corporation, Armonk, NY (US)

( * ) Notice: Subject to any disclaimer, the term of this patent is extended or adjusted under 35 U.S.C. 154(b) by 394 days.

(21) Appl. No.: 10/378,579

(22) Filed: Feb. 28, 2003

(65) Prior Publication Data

US 2004/0172610 A1 Sep. 2, 2004

(51) Int. Cl.$^7$ .............................................. G06F 17/50
(52) U.S. Cl. .......................... 716/19; 716/20; 716/21; 430/5; 430/311; 430/312; 430/313
(58) Field of Search .......................... 716/19–21; 430/5, 430/30, 310–314; 250/492.22, 492.23, 291.1, 291.22, 293.1; 355/55, 58; 359/350, 355, 385, 387; 356/233

(56) References Cited

U.S. PATENT DOCUMENTS

| | | |
|---|---|---|
| 5,242,770 A | 9/1993 | Chen et al. |
| 5,256,505 A | 10/1993 | Chen et al. |
| 5,340,700 A | 8/1994 | Chen et al. |
| 5,447,810 A | 9/1995 | Chen et al. |
| 5,636,002 A | 6/1997 | Garofalo et al. |
| 5,707,765 A | 1/1998 | Chen et al. |
| 5,723,233 A | 3/1998 | Garza et al. |
| 5,821,014 A | 10/1998 | Chen et al. |
| 5,827,623 A | 10/1998 | Ishida et al. |
| 5,849,440 A | 12/1998 | Lucas et al. |
| 5,922,513 A * | 7/1999 | Jeon et al. ................. 430/311 |
| 5,958,635 A | 9/1999 | Reich et al. |

(Continued)

OTHER PUBLICATIONS

Smith et al., "Challenge in High NA. Polarization, and Photoresists," Rochester Institute of Technology, Microelectronic Engineering Dept., Rochester, NY, pp. 2002, pp. 1–14.*

IBM Application "Method to Determine Optical Proximity Correction and Assist Feature Rules Which Account for Variations in Mask Dimensions" filed Jan. 5, 2001, U.S. Appl. No. 09/754,910, SPIE microlithography Mar. 3–8, 2002, Santa Clara, A Published Aug. 2, 2002, vol. 4691 Optical Microlithography XV, Gabor et al.

TCAD development for lithography resolution enhancement by Liebman, et al IBM J. Res & Dev. vol. 45 No. 5 Sep. 2001

Lithographic comparison of assist feature design strategies, Mansfield, et al. In optical microlithography XIII, Christopher J. Progier, Editor.

*Primary Examiner*—Vuthe Siek
(74) *Attorney, Agent, or Firm*—Todd M.C. Li

(57) ABSTRACT

A method of designing a mask for imaging an integrated circuit (IC) design layout is provided to efficiently configure subresolution assist features (SRAFs) corresponding to an optimally configured annular illumination source of a lithographic projection system. A critical pitch is identified for the IC design, and optimal inner and outer radial coordinates of an annular illumination source are determined so that the resulting image projected through the mask will be optimized for the full range of pitches in the design layout. A relationship is provided for determining an optimal inner radius and outer radius for the annular illumination source. The number and placement of SRAFs are added to the mask design so that the resulting range of pitches substantially correspond to the critical pitch. The method of configuring SRAFs so that the image will have optimal characteristics, such as good contrast and good depth of focus, is fast.

20 Claims, 11 Drawing Sheets

U.S. PATENT DOCUMENTS

| | | | |
|---|---|---|---|
| 6,013,397 A | 1/2000 | Lin et al. | |
| 6,077,310 A | 6/2000 | Yamamoto et al. | |
| 6,081,658 A | 6/2000 | Rieger et al. | |
| 6,120,953 A | 9/2000 | Lin et al. | |
| 6,165,693 A | 12/2000 | Lin et al. | |
| 6,265,121 B1 | 7/2001 | Lin et al. | |
| 6,284,419 B2 | 9/2001 | Pierrat et al. | |
| 6,291,112 B1 | 9/2001 | Lin et al. | |
| 6,303,252 B1 | 10/2001 | Lin et al. | |
| 6,312,856 B1 | 11/2001 | Lin et al. | |
| 6,319,644 B2 | 11/2001 | Pierrat et al. | |
| 6,335,130 B1 * | 1/2002 | Chen et al. | 430/5 |
| 6,338,922 B1 * | 1/2002 | Liebmann et al. | 430/5 |
| 6,373,553 B1 * | 4/2002 | Singh | 355/55 |
| 6,413,683 B1 | 7/2002 | Liebmann et al. | |
| 6,421,820 B1 | 7/2002 | Mansfield et al. | |
| 6,453,457 B1 | 9/2002 | Pierrat et al. | |
| 6,459,156 B1 | 10/2002 | Travis et al. | |
| 6,472,108 B1 | 10/2002 | Lin et al. | |
| 6,482,559 B2 | 11/2002 | Lin et al. | |
| 6,485,891 B1 * | 11/2002 | Noguchi et al. | 430/311 |
| 6,519,760 B2 * | 2/2003 | Shi et al. | 716/19 |
| 6,620,564 B2 * | 9/2003 | Hung et al. | 430/30 |
| 6,795,163 B2 * | 9/2004 | Finders | 355/53 |
| 6,871,337 B2 * | 3/2005 | Socha | 716/19 |

* cited by examiner

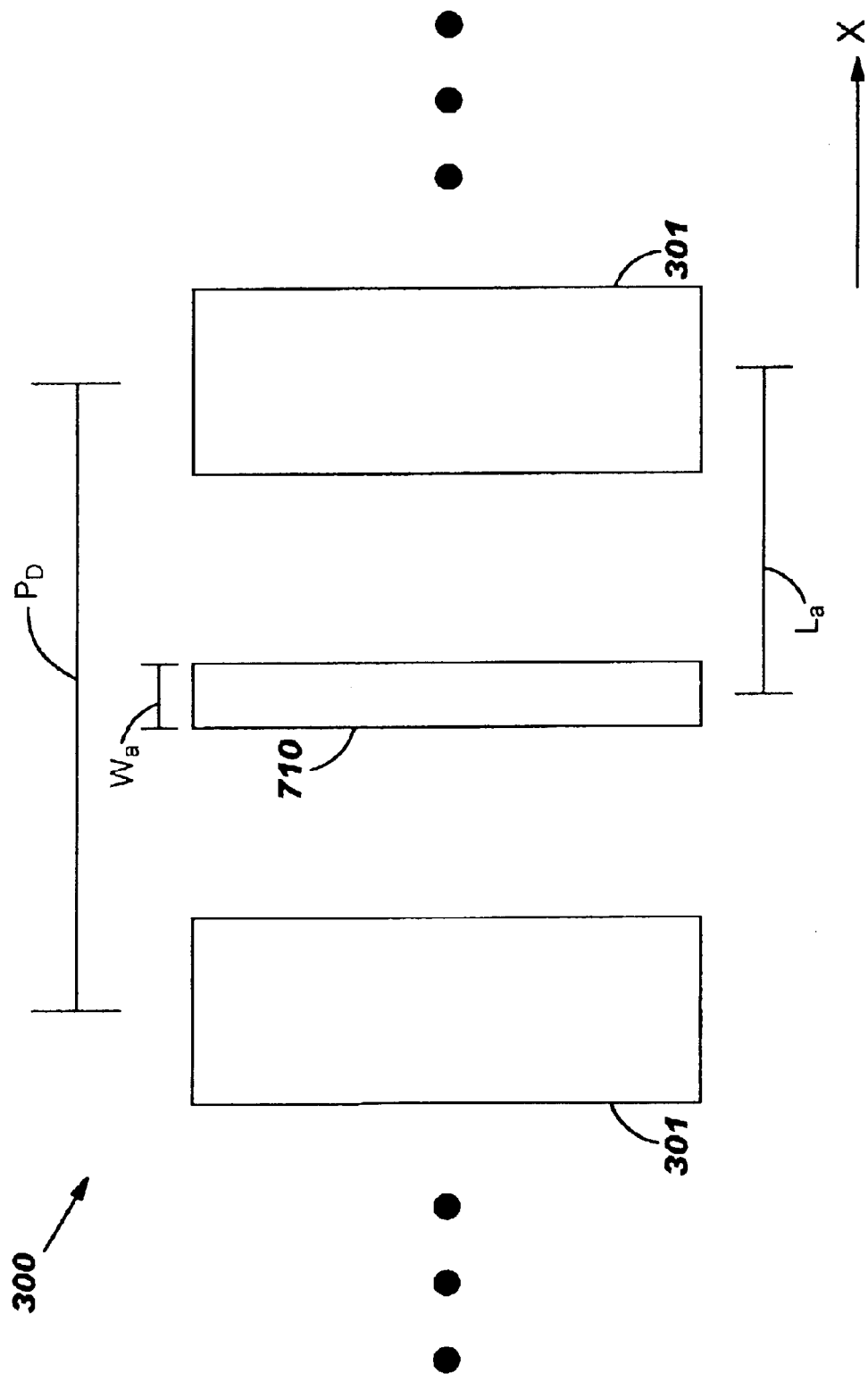

FIG. 4

| Range of Pitch $P_D$ | Number of SRAFs per Feature Pair |
|---|---|
| $P_{MIN} \leq P_D \leq P_{TRANS}$ | 0 |
| $P_{TRANS} + \Delta W \leq P_D \leq 3P_{CRIT} - \Delta W$ | 1 |
| $3P_{CRIT} \leq P_D \leq 4P_{CRIT} - \Delta W$ | 2 |
| $4P_{CRIT} \leq P_D \leq 5P_{CRIT} - \Delta W$ | 3 |
| $5P_{CRIT} \leq P_D \leq 6P_{CRIT} - \Delta W$ | 4 |
| ⋮ | ⋮ |
| $(N+1)P_{CRIT} \leq P_D \leq P_{MAX}$ | N |

FIG. 5

Symmetric SRAF Position Relative To Primary Feature

| Number of SRAFs per Feature Pair | $L_1$ | $L_2$ | $L_3$ ••• | $L_P$ |
|---|---|---|---|---|
| 0 | — | — | — | — |
| 1 | $1/2\ P_D$ | — | — | — |
| 2 | $P_{CRIT}$ | — | — | — |
| 3 | $P_{CRIT}$ | $1/2\ P_D$ | — | — |
| 4 | $P_{CRIT}$ | $2\ P_{CRIT}$ | — | — |
| 5 | $P_{CRIT}$ | $2\ P_{CRIT}$ | $1/2\ P_D$ | — |
| ⋮ | ⋮ | ⋮ | ⋮ | ⋮ |
| N | $P_{CRIT}$ | $2\ P_{CRIT}$ | $3\ P_{CRIT}$ ••• | $0.5\ P_D$ |

PITCH-BASED SUBRESOLUTION ASSIST FEATURE DESIGN

FIELD OF THE INVENTION

The present invention relates, in general, to the fabrication of integrated circuits, and, more particularly, to a method of designing lithographic masks or reticles for use in manufacturing semiconductor devices, and more specifically, for implementing sub-resolution assist features in such lithographic mask or reticle designs.

BACKGROUND OF THE INVENTION

There is a continuing effort to reduce the dimensions of integrated circuit (IC) devices, and this has required greater precision in the tools used to manufacture IC devices. IC devices are designed using computer-aided design (CAD) or technology-computer-aided design (TCAD) layout tools which allow designers and manufacturers to plan the layout of circuits on a semiconductor wafer. The finished designs must be transferred to the wafer in a manner that allows device features to be produced by various processes of etching, depositing, implanting, and the like. This is done by applying a photoresist (also known as resist) layer to the surface of the wafer and then exposing the photoresist to radiation transmitted through a mask or reticle having patterns of transparent and opaque areas according to the feature or features to be formed. The exposed photoresist is developed to provide openings in the photoresist layer through which the surface of the wafer is exposed for the process desired. This process of transferring the pattern to the wafer is generally referred to as photolithography. The finished product typically includes a number of patterned layers formed on the wafer, in which the patterns in different layers (or levels) are aligned to allow the formation of IC devices and circuit interconnection. Each patterned level or layer is typically formed using a separate mask or reticle layout pattern designed to form the desired pattern for that patterned level or layer.

The overall resolution of a photolithographic process refers to the minimum feature size (i.e., typically a critical dimension, or CD) that can be adequately printed, or "resolved," within specifications such as line-width variation (e.g. typically within about 10%), resist wall angle (e.g. $\geq 85°$) and minimum resist thickness after develop. This overall resolution limit depends on the resolution of the optical lithographic system, the properties of the resist as well as the subsequent etch processes. The resolution of the lithography (optical) system, that is, the ability to form a resolvable image pattern on the wafer, is critical to the overall process, and can be improved by resolution enhancement techniques (RETs), including modifications of the mask or reticle, as discussed in more detail below.

The resolution R of an optical lithography system is conventionally quoted in terms of the smallest half-pitch of a grating that is resolvable as a function of illumination wavelength $\lambda$ and a numerical aperture NA, as expressed by Rayleigh's equation, $R = k_1 \lambda / NA$, where $k_1$ is the Rayleigh constant. For conventional optical lithography, the ultimate resolution limit is reached at $k_1 = 0.5$, the state at which only one set of diffracted orders can pass through the imaging optical system. Even as exposure wavelengths decrease from 248 nm to 157 nm, and numerical apertures increase from 0.5 to 0.85, conventional optical lithography is still challenged by resolution below $k_1 = 0.5$. Approaching $k_1 = 0.5$ imposes formidable problems due to image quality degradation associated with the loss of increasing numbers of diffracted orders.

At low $k_1$ imaging, significant modifications to mask designs are required to print features in the desired fashion on the wafer. Due to the extreme sensitivity of many of these features to errors on the mask, in the stepper lens or in the lithography process (e.g. focus and dose), it is critical that these mask design modifications, or resolution enhancement techniques (RETs), be done properly. Resolution enhancement techniques such as optical proximity correction (OPC), subresolution-assist-feature-enhancement (SRAF) lithography and phase-shifted-mask-enhanced (PSM) lithography have become increasingly important as resolution has increased beyond the quarter-micron level. In addition, RETs have been combined with the use of off-axis illumination (OAI) and advanced resist processing to bring the $k_1$ value closer to 0.25.

Off-axis illumination (OAI) provides resolution enhancement by modifying the illumination direction incident on the mask so as to eliminate or reduce on-axis illumination. For on-axis (i.e., propagation along the optical axis) light incident on a grating having pitch P, the $m^{th}$ diffracted order will propagate at an angle $\theta_m = \sin^{-1}(m\lambda/P)$. However, only non-zero diffracted orders contain information about the grating, so at least one non-zero order must be collected in order to form an image. In other words, the projection lens must be large enough to collect at least the first order diffracted beams as well as the zero order beam. For the case of on-axis illumination, the first order diffracted beams m=−1 and m=+1 will propagate at an angles $\theta_1 = \pm \sin^{-1}(\lambda/P)$ relative to the optical axis, and thus the smallest pitch will be limited by the ability of the optical system to collect at least 3 beams (i.e., m=−1, 0, and +1), that is, a projection lens capable of collecting orders subtending an angle $2\theta_1$. For a grating having equal lines and spaces having pitch P and line widths (CD) equal to P/2, the minimum feature size resolvable by such a lithographic system is $d = 0.5\lambda/NA$, where $\sin(\theta_1) = NA$, and thus $k_1 = 0.5$ as discussed above.

FIG. 1 schematically illustrates an optical projection lithographic system in which illumination light (actinic energy) is provided through the aperture of pupil 110, and collected by a condenser lens 120. An illumination beam 130 is directed to a mask or reticle 140. The light is diffracted by the mask 140, creating diffracted orders m=0,±1,±2, . . . , which are then collected by a projection lens 150, and then projected to the wafer 160. In the case of off-axis illumination (OAI), the zeroth order beam will propagate undiffracted at an angle $\theta_0$ from the optical axis 101, as illustrated in FIG. 1, but only one of the +1 or −1 diffracted orders, propagating at angle $\theta_1$, need be collected in order to form an image on the wafer 160. Thus, OAI provides resolution enhancement because the angle collected by the lithographic system will allow a correspondingly smaller grating pitch P to be used. The angle of propagation can be optimized for a primary or target pitch. In addition, if the angle of off-axis illumination is chosen so that zero order and one of the first orders are at the same distance from the center of the pupil of the projection lens 150, the relative phase difference between the zeroth order and that first order will be zero, making the image less subject to defocus, and thus increasing the depth of focus (DOF) for an associated pitch.

The drawback of OAI is that pitches other than the primary pitch will print with degraded process windows. In addition, since there are no discrete diffracted orders for isolated lines, there is little improvement of resolution for isolated lines as compared to densely pitched lines and spaces. The use of sub-resolution assist features provides a means of recovering the process window for pitches that are not enhanced by the OAI. By creating nonprinting (non-resolved or sub-resolution) supplementary patterns next to the primary patterns in such a way that the combined layout approximately reproduces the primary pitch, thus producing the required interference effects, the overall process window can be improved.

Sub-resolution assist features (SRAFs), also known as scattering bars or intensity leveling bars, that are incorporated in photomask layouts, can provide significant lithographic benefit (e.g. improved process window) in the imaging of very large scale integrated (VLSI) circuit patterns when used in conjunction with OAI (e.g. annular illumination). Methods for selecting size and placement of SRAFs have been discussed in the prior art.

One method for placing assist features (SRAFs) is to simply provide for placement of a small, finite number (e.g. one or two) of assist features having fixed (sub-resolution) width. Referring to FIG. 2A, adjacent critical features 11 (e.g. lines) may have variable spacing, but a primary pitch $P_0$ for patterns of lines 11 that are periodic (in FIG. 2A, the direction of periodicity is assumed to be in the x-direction, but for convenience, only two of the repeating features 11 are shown). The primary pitch is often one that is deemed to be critical, for example, to ensure good overlay of features with features formed in an underlying layer. Industry standard practice is to use place a maximum of SRAFs 10, 12, 14, 16, 18, 20, 22 between two lines 11, where the widths and placements of the SRAFs are fixed. The resulting pitches $P_1$, $P_2$, $P_3$, and $P_4$ will not typically match the primary pitch $P_0$, and will often result in less than optimal lithographic process windows. Referring to FIG. 2B, the case of an isolated line 15 is illustrated, in which only one assist feature 24, 26 is provide per edge of the isolated line 15. (A feature is deemed lithographically "isolated" if the distance from the feature to a nearest neighbor effectively exceeds the range of significant optical interaction.) However, even though the placement of assist features 24 and 26 may correspond to $P_0$, using only two SRAFs is typically inadequate to reproduce the interference effect required to obtain an optimal process window.

The assignment of assist feature width, number and location is preferably optimized to yield the best through-pitch linewidth control or overall process window. The size of assist features must be chosen so that they are large enough to have the desired process window enhancement but small enough not to resolve as actual patterns on an exposed wafer. In addition, decisions must be made regarding where to place assist features, and how many must be added. Such optimization, however, requires very costly and time-consuming theoretical and experimental processes. For example, FIG. 2C illustrates a more preferred placement of assist features in which as many as 4 assist features (20, 23, 25, 22) may be placed, and where assist feature positions $P_1$, $P_2$, $P_3$, $P_4$, $P_5$ and $P_6$ are determined empirically to provide improved process windows. Similarly, for the case of isolated features 15, assist features 28, 30 are provided in addition to assist features 24, 26 at locations $P_7$, $P_8$ as illustrated in FIG. 2D. The locations $P_7$, $P_8$ of assist features 24, 26, 28 and 30 are determined empirically to provide good process window parameters, which can be a costly and time-consuming process. For example, for critical feature pitches that require 4 SRAFs (20, 23, 25, 22), there are at least 4 parameters ($P_5$, $P_6$, $w_1$, $w_2$) that can be varied. Thus, evaluating only three values for each of those 4 variable dimensions results in $3^4$ (3 to the fourth power), or 81 possible combinations of parameters. Since a typical layout may have several tens or hundreds of possible pitches to evaluate, the empirical evaluation of all combinations quickly becomes impractical. Furthermore, there are many more possibilities for each parameter, and even this impractically large number of data points represents a sparse sampling for realistic layout configurations.

Thus, there remains a need to provide for a method for implementing sub-resolution assist features in lithographic mask or reticle designs that maximizes process window in a fast, cost-effective manner.

SUMMARY OF THE INVENTION

Accordingly, in order to clearly and unambiguously distinguish over the state-of-the art, pursuant to the present invention there is utilized a fast method for generating a configuration of subresolution assist features (SRAFs) in the design of a mask for use with an annular illumination system that provides an image that has optimal characteristics, such as good image contrast and good depth of focus.

Another objective of the present invention is to ensure that a critical pitch of a design layout is imaged with an annular illumination range that is optimized to ensure that the critical pitch features are imaged with good fidelity (e.g. having good image contrast, depth of focus, good process window, etc.).

A further objective of the present invention is to determine an optimal configuration of an annular illumination source to ensure that the full range of pitches in a final mask design including SRAFs will be optimally imaged (e.g. with good image contrast, good depth of focus, etc).

Yet another objective of the present invention is to provide a computer system and program product for efficiently designing a lithographic mask that includes SRAFs that are configured to ensure optimal image characteristics (e.g. good image contrast, depth of focus, etc.) across the full range of pitches in the design, and to determine an optimal configuration of an annular illumination source for use with the resulting mask.

Essentially, the inventive method comprises the steps of:

providing system parameters of a lithographic projection system having an annular illumination source, the system parameters including a projection numerical aperture NA, and a wavelength $\lambda$, an inner radius $\sigma_{inner}$ and an outer radius $\sigma_{outer}$ of said annular illumination source;

providing an IC design layout including a plurality of first critical features arranged in a pattern having a critical pitch $P_{Crit}$, wherein the critical pitch is greater than or equal to a minimum pitch $P_{Min}$ of the design layout and less than a maximum pitch $P_{Max}$ of the design layout;

determining a critical radius $\sigma_{Crit}$ that provides an optimal lithographic process window corresponding to the critical pitch;

determining the outer radius and the inner radius of the annular illumination source so that the critical radius is greater than or equal to the inner radius and less than or equal to the outer radius; determining a transition pitch $P_{Trans}$ chosen as a maximum pitch for which sub-resolution assist features (SRAFs) need not be added;

identifying a plurality of second critical features within the design layout having a design pitch $P_D$ that is larger than the transition pitch $P_{Trans}$;

disposing one or more SRAFs within the IC design layout between each of the second critical features to form a modified IC design layout including a final combined pattern of SRAFs and the second critical features having a combined pitch $P_{Combined}$, wherein the combined pitch substantially corresponds to the critical pitch; and designing a mask layout for use with the lithographic projection system, wherein the mask layout corresponds to the modified IC design layout including the final combined pattern of the one or more SRAFs and said second critical feature.

In another aspect of the present invention, a maximum pitch $P_{Max}$ is selected to be a widest pitch for which inclusion of SRAFs will substantially improve the optimal lithographic process window.

Also, in accordance with the present invention, the outer radius $\sigma_{outer}$ of the annular illumination source is determined according to the equation $$\sigma_{outer} = \frac{\lambda}{2NAP_{Min}}.$$

Further, in accordance with the present invention, an optimal, critical radius $\sigma_{Crit}$ corresponding to said critical pitch $P_{Crit}$ is determined according to the equation, $$\sigma_{Crit} = \frac{\lambda}{2NAP_{Crit}}$$

and then an optimal inner radius $\sigma_{inner}$ of the annular illumination is determined by solving the equation $$\int_{\sigma_{inner}}^{\sigma_{outer}} d\sigma(\sigma_{Crit} - \sigma)\sigma\cos^{-1}\left[\left(\sigma_{Crit} - \frac{1}{4\sigma_{Crit}}\right)\sigma + \frac{1}{4\sigma_{Crit}\sigma}\right] = 0.$$

This equation may be solved for the inner radius $\sigma_{inner}$ by numerical integration.

In another aspect, the present invention includes providing a write delta $\Delta W$ for a mask writer tool and determining a transition pitch $P_{Trans}$ that is the smaller of $$\frac{\lambda}{2NA\sigma_{inner}}$$

and $(2P_{Crit}-\Delta W)$.

In accordance with the present invention, the method further includes providing a write delta $\Delta W$ for a mask writer tool, and identifying a design pitch $P_D$ of second primary critical features that is larger than the sum of the transition pitch $P_{Trans}$ and the write resolution $(P_{Trans}+\Delta W)$, and disposing one SRAF in the design layout between each of the second critical features if the design pitch $P_D$ has a value $(P_{Trans}+\Delta W) \leq P_D \leq (3P_{Crit}-\Delta W)$, or disposing 2 or more SRAFs in the design layout between each of the second critical features where the number of SRAFs N satisfies the relation $(N+1)P_{Crit} \leq P_D \leq [(N+2)P_{Crit}-\Delta W]$ if the identified design pitch $P_D$ has a value greater than or equal to $3P_{Crit}$ and less than or equal to the maximum pitch $P_{Max}$.

In yet another aspect of the present invention, the method further includes forming a mask in accordance with the mask layout having SRAFs optimally configured in accordance with the present invention, and wherein a mask writer tool having the write delta $\Delta W$ is used to form the mask.

In another aspect of the present invention, each of the SRAFs in the mask layout has an SRAF width at least as wide as a minimum manufacturable width and less than a width that will print using the lithographic projection system having the optimized inner and outer radial coordinates determined in accordance with the present invention.

Further, in yet another aspect of the present invention, a computer program product is provided for causing a computer system to design a lithographic mask having SRAFs that are configured in accordance with the present invention to optimize the image characteristics of the IC circuit layout.

BRIEF DESCRIPTION OF THE ACCOMPANYING DRAWINGS

FIG. 3A a portion of a pattern of primary features of an integrated circuit layout, including placement of subresolution assist features by a method in accordance with the present invention.

Figure 3B:
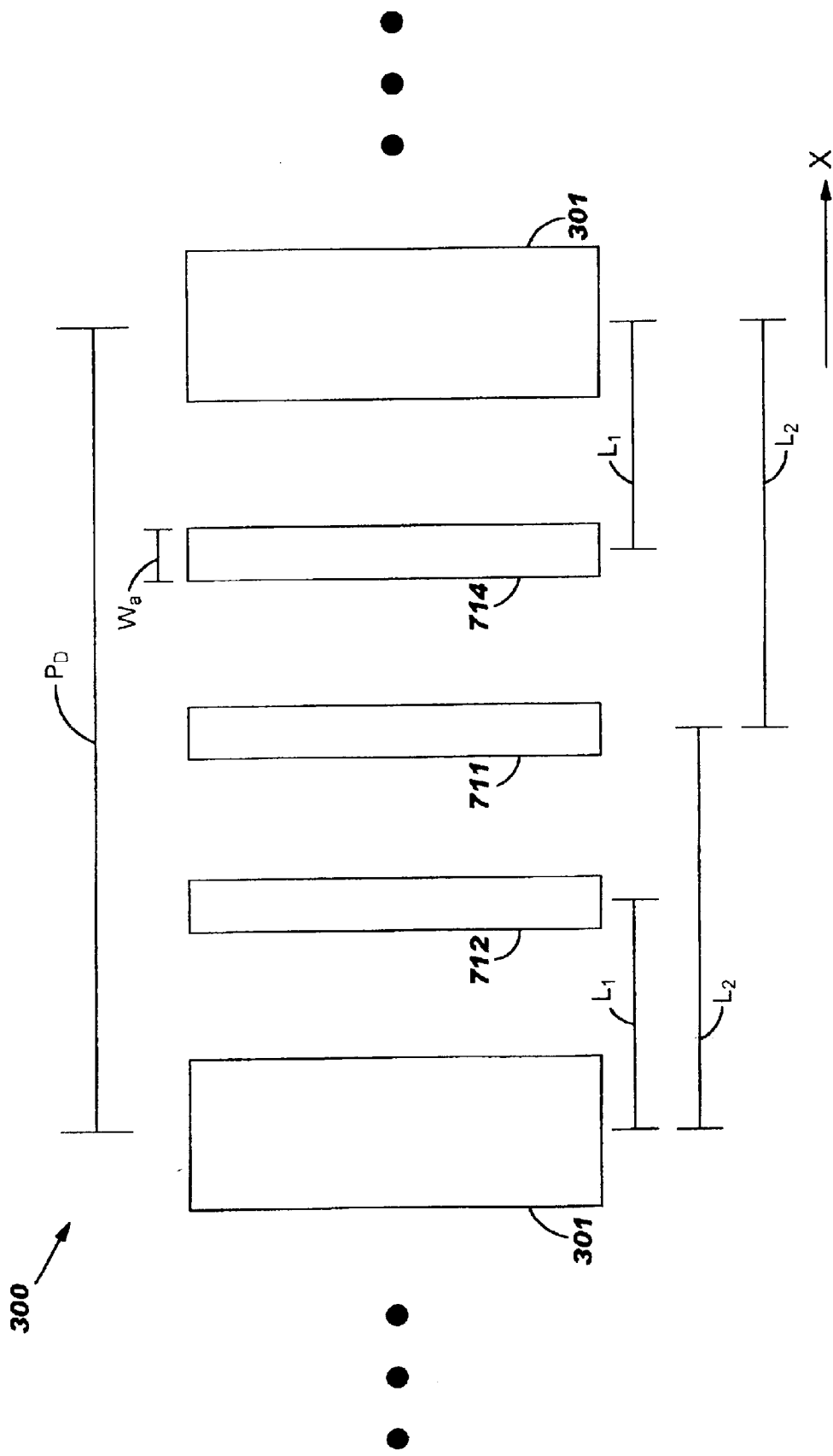

FIG. 3B a portion of a pattern of primary features of an integrated circuit layout, including placement of subresolution assist features by a method in accordance with the present invention.

FIG. 4 illustrates a set of rules for determining the number of subresolution assist features to be included in accordance with the present invention.

FIG. 5 illustrates a set of rules for determining the placement of subresolution assist features in accordance with the present invention.

Figure 6:
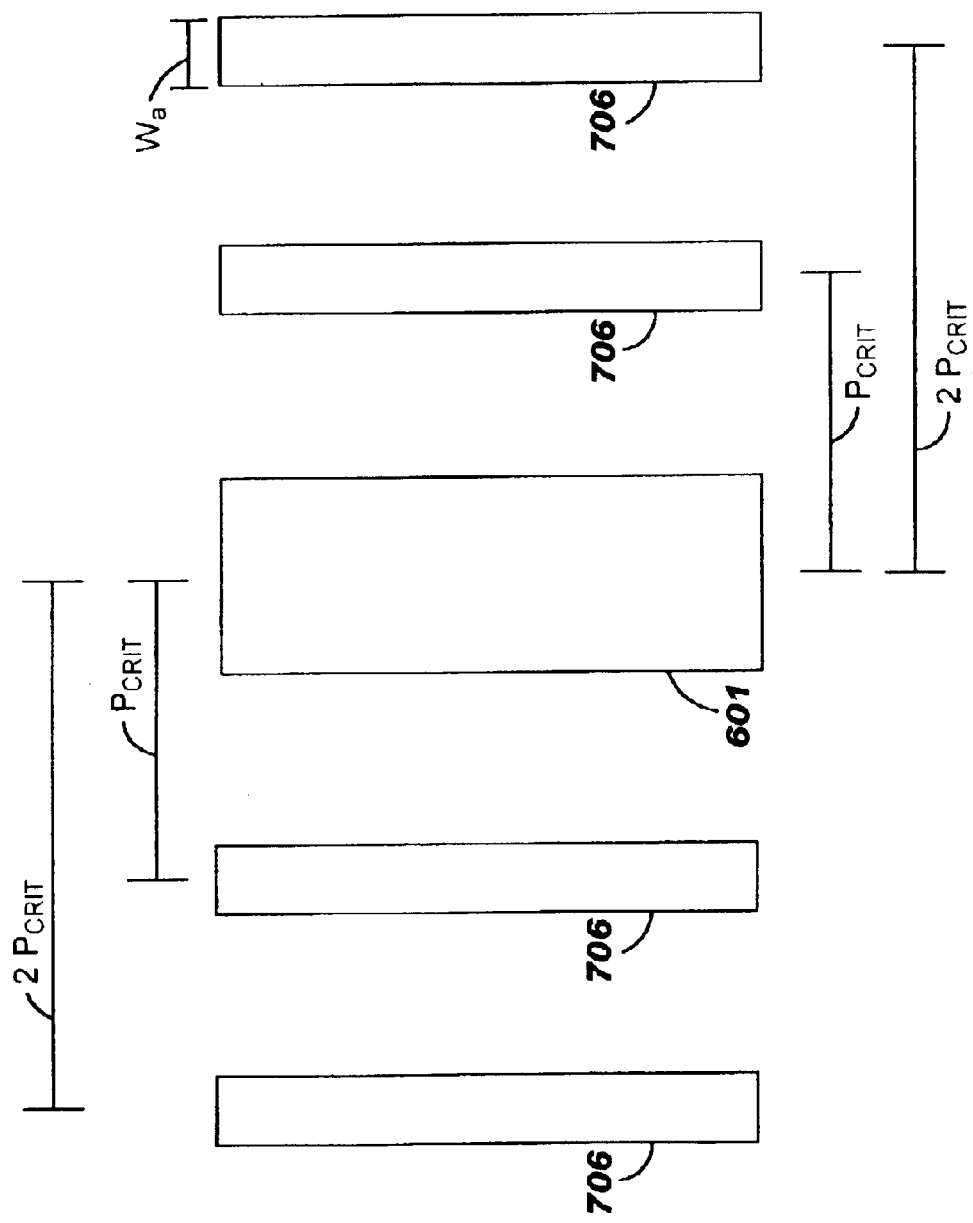

FIG. 6 illustrates an isolated feature of an integrated circuit layout including placement of subresolution assist features in accordance with the present invention.

Figure 7:
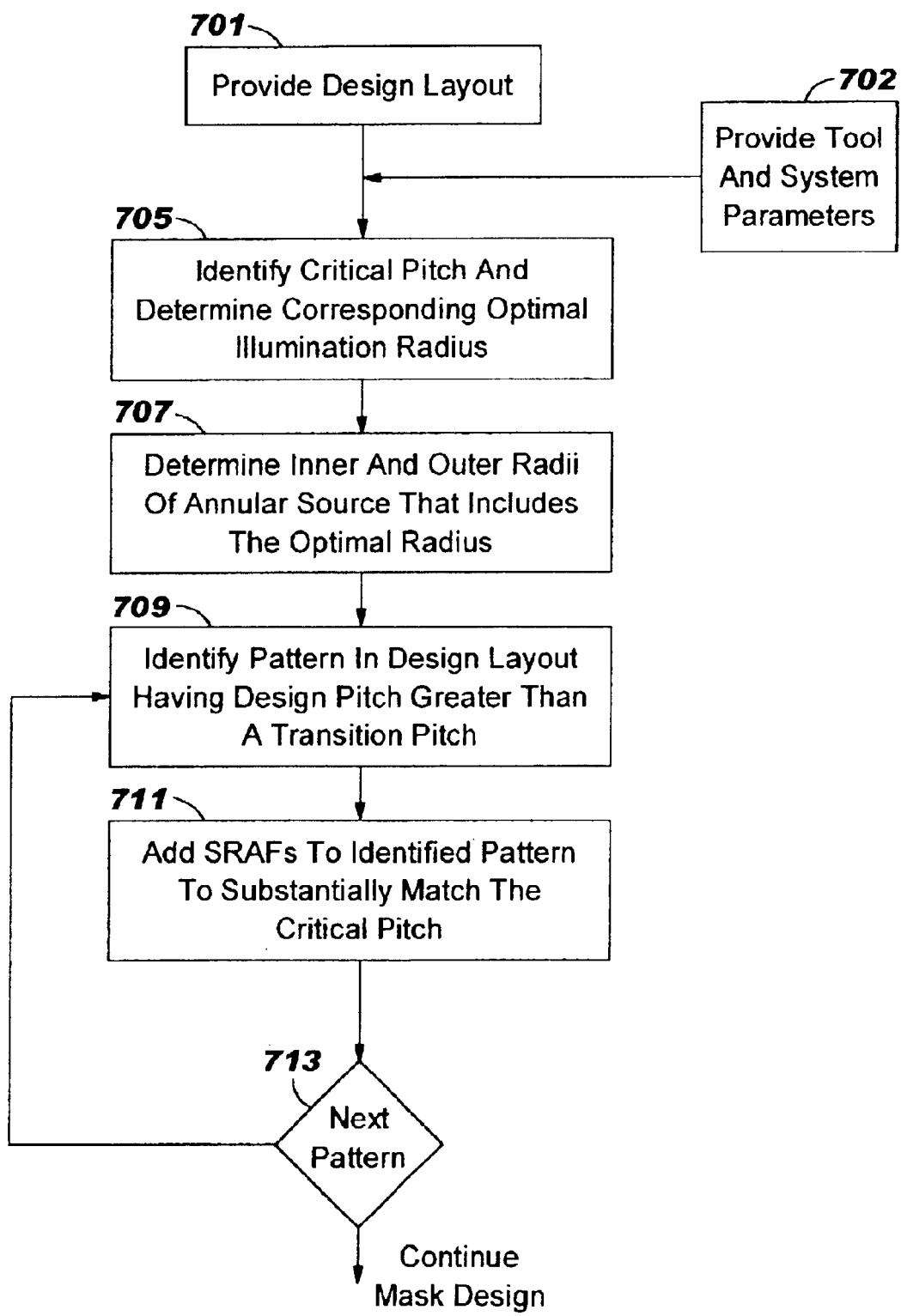

FIG. 7 illustrates a flow chart of an embodiment of the method in accordance with the present invention.

Figure 8:
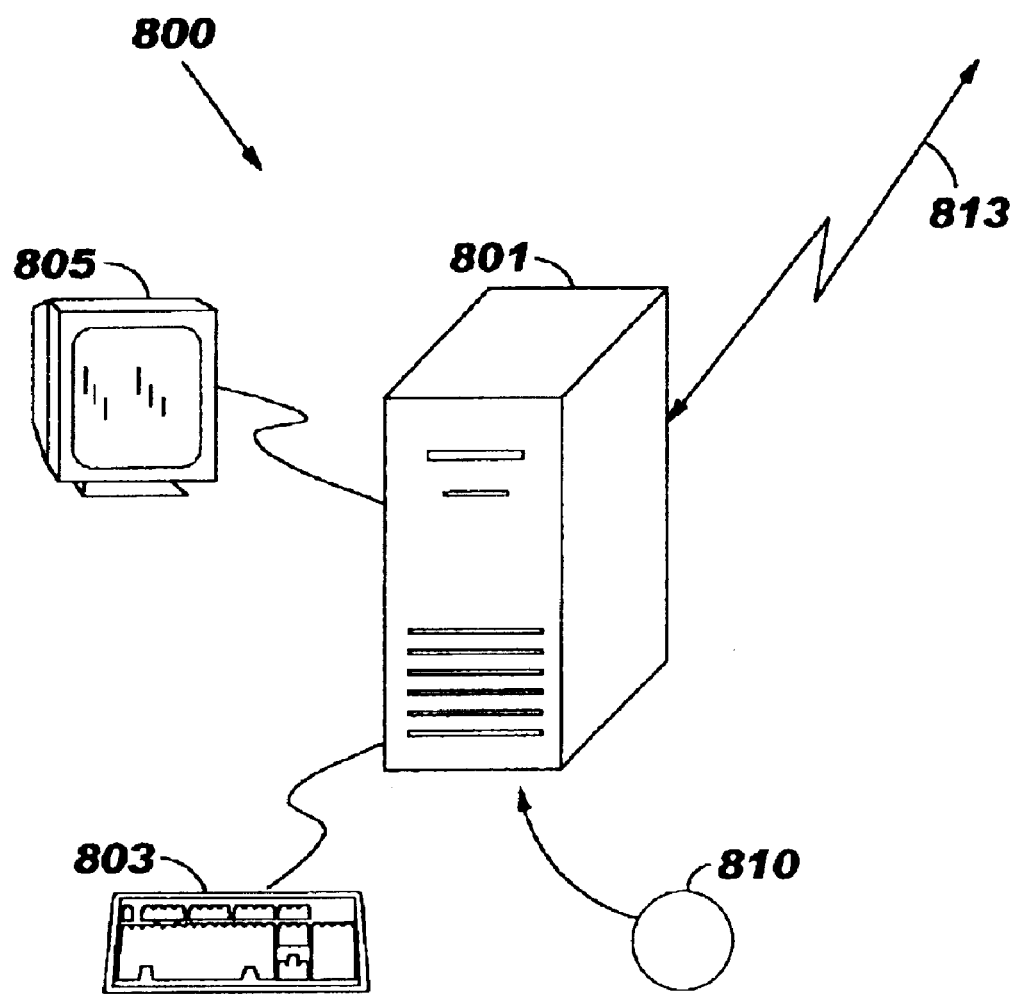

FIG. 8 illustrates a computer system and program product for implementing the method in accordance with the present invention.

DETAILED DESCRIPTION OF PREFERRED EMBODIMENTS

Reference may now be made to the following detailed description of preferred embodiments of the invention, taken in conjunction with the accompanying drawings, which are not necessarily drawn to scale.

In accordance with the present invention, a method is provided for designing a lithographic mask for use with a lithographic projection system that has an annular illumination source so that the lithographic process window is optimized. More particularly, a preferred embodiment of the method provides a method for rapidly determining the configuration (for example, the number and spacing) of subresolution assist features (SRAFs), that is matched to the radial coordinates of the annular illumination source that are optimal for critical pitches of the integrated circuit (IC) design layout to be printed.

A lithographic projection system that has an annular illumination source having a radius σ is known to provide a good lithographic process window for a periodic (grating) pattern. A good lithographic process window is one where there is a wide range of defocus and exposure dose conditions within which the mask pattern will print within the desired tolerance range (for example, the width of printed critical features is CD within an acceptable tolerance, such as 10%). If the CD is printing within tolerance for a wide range of process conditions, this implies that the contrast across edges of the projected image is relatively large (e.g. the image intensity across a feature edge has a large gradient). The lithographic process window for a given periodic mask pattern (i.e., a grating pattern) having a pitch $P_g$ can be optimized (e.g. will be relatively insensitive to defocus) for a lithographic system having a projection numerical aperture of NA, and an annular illumination of wavelength λ, if the radial coordinate $\sigma_{opt}$ of the annular illumination obeys the relationship:

$$\sigma_{opt} = \frac{\lambda}{2NA \cdot P_g}.$$

Similarly, given an illumination source having a radial coordinate $\sigma_g$, the grating pitch $P_{opt}$ that will print with an optimal process window obeys the relationship:

$$P_{opt} = \frac{\lambda}{2NA\sigma_g}.$$

These equations express the imaging conditions for optimal placement of SRAFs, so that maximum contrast of design features is obtained in the projected image. The relationship between illumination from a point source having a radial coordinate σ and the optimal off-axis illumination has the effect, for a point source, of producing an image having an infinite depth of focus. Such conditions are obtained when the zeroth order is directed at an angle $\theta_0$ relative to the optical axis that is equal to the angle $\theta_1$ of the first diffracted order (either m=1 or −1).

However, a realistic integrated circuit (IC) design layout typically has a wide range of pitches. As discussed above, the purpose of including SRAFs within the corresponding mask design for the IC design layout, is to attempt to optimize the process window for a given annular illumination configuration. However, conventional methods provide simplistic SRAF configurations that result in less than optimal process windows, or provide optimal process window at the cost of expensive and time consuming calculations. On the other hand, very often it is possible to identify a pitch that is critical in the layout. For example, there may be a pitch that must be printed very precisely and consistently to ensure good overlay with a layer previously printed on the wafer. Such a pitch may correspond to that in the contact level, where electrical contact is crucial to the delivery of electrons and/or holes to the other layers.

For a given IC design layout, it is possible to identify a critical periodic pattern of features and thus designating the pitch of that critical pattern as a critical pitch $P_{Crit}$. In accordance with the present invention, given a selected critical pitch $P_{Crit}$, the configuration of SRAFs is selected so that the SRAFs and other critical layout features combine to form mask layout patterns having combined pitches that are substantially similar to the selected critical pitch $P_{Crit}$, which can be optimized with a corresponding annular illumination configuration to provide an optimal process window for the entire IC layout. A preferred embodiment for configuring the annular illumination and selecting the placement and number of SRAFs is described in more detail below.

Figure 1:
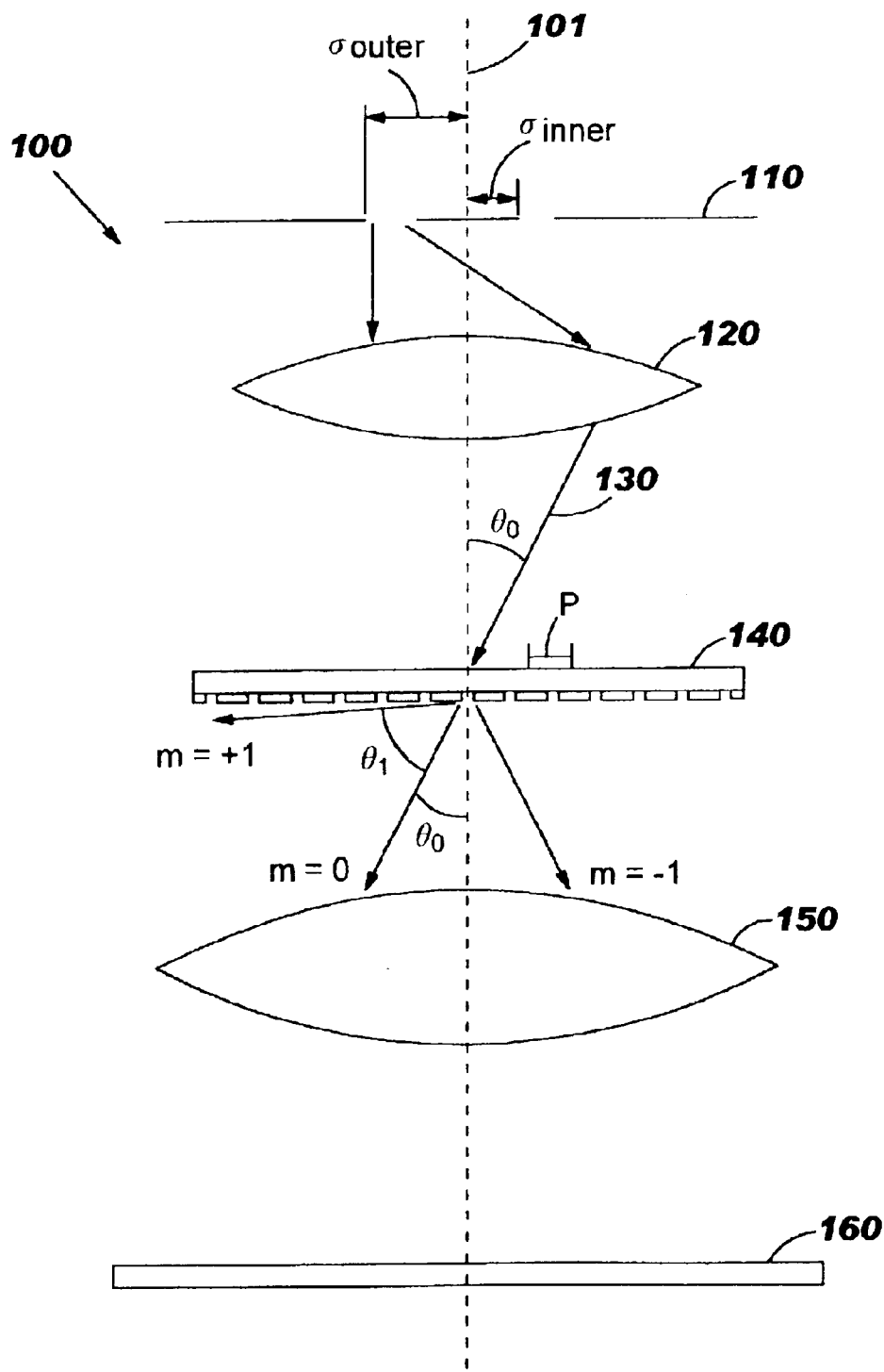
FIG. 1 illustrates, diagrammatically, a cross-section view of a lithographic projection system.
Figure 1A:
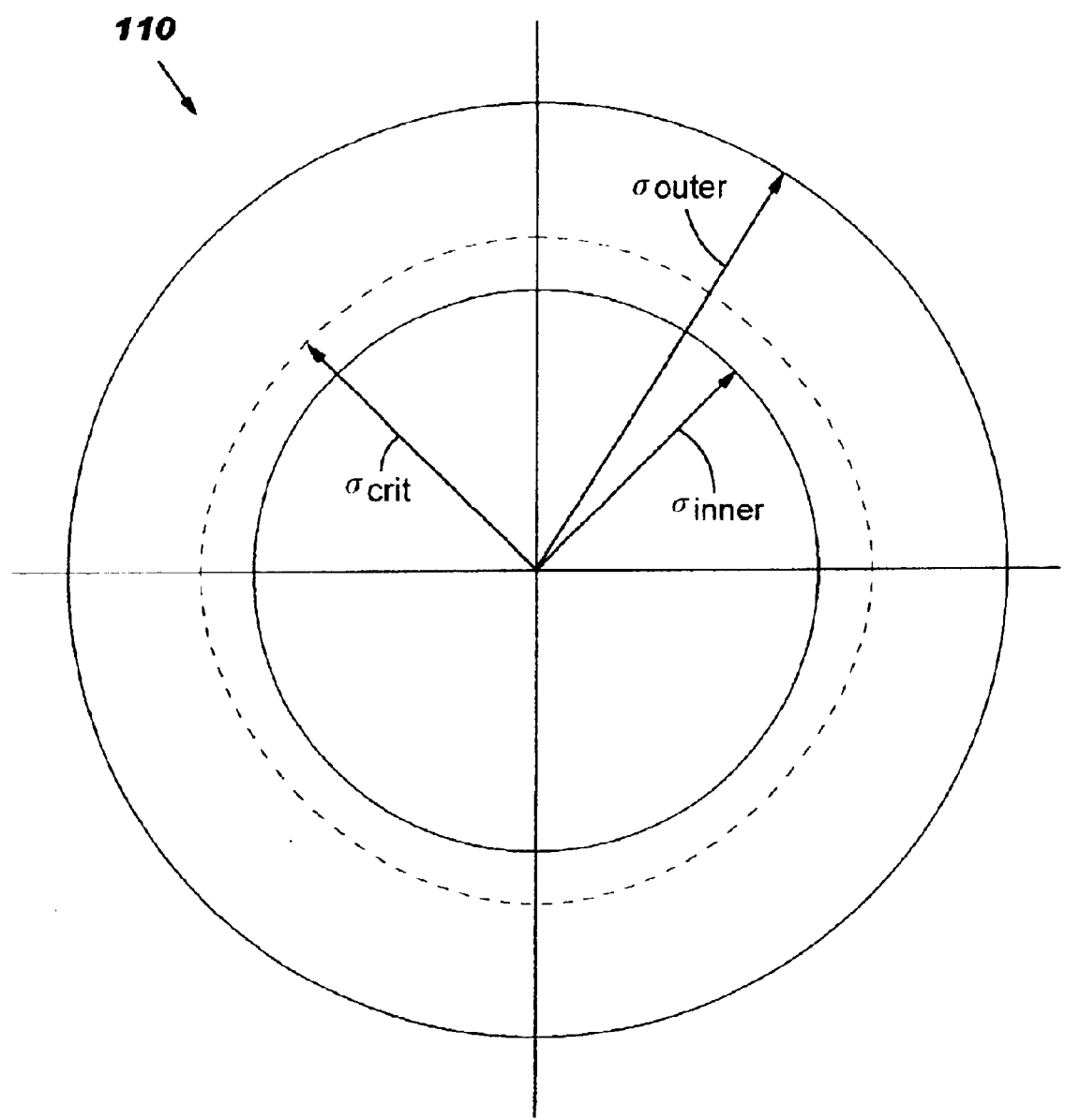
FIG. 1A illustrates a plane view of an annular illumination source.
Figure 2B:
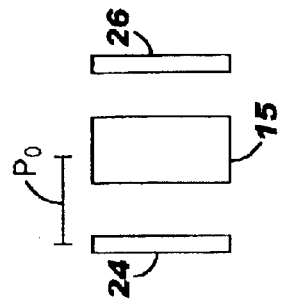
FIG. 2B illustrates an isolated feature of an integrated circuit layout including placement of subresolution assist features according to a conventional method.
Figure 2A:
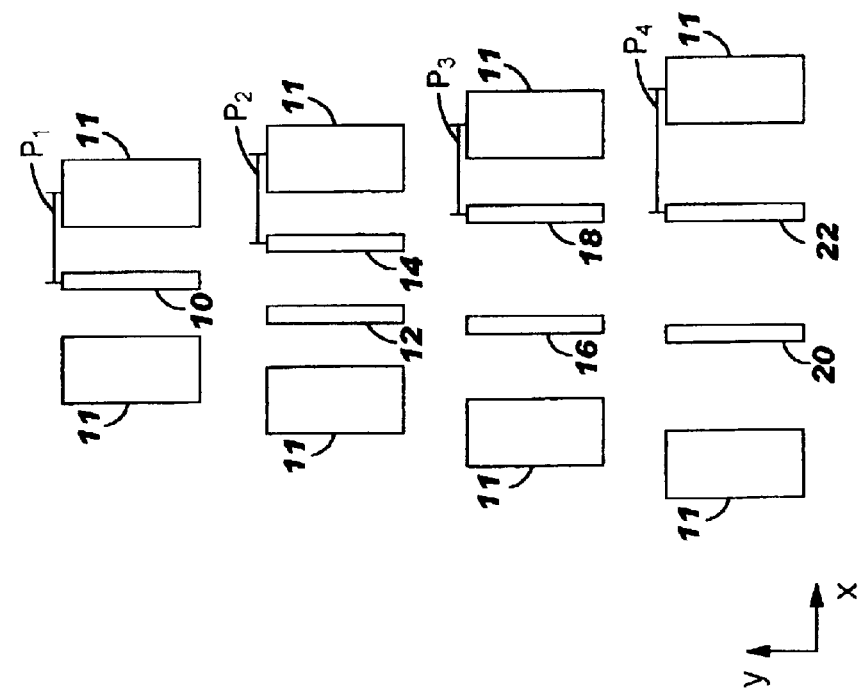
FIG. 2A illustrates a portion of a pattern of primary features of an integrated circuit layout, including placement of subresolution assist features according to a convention method.
Figure 2D:
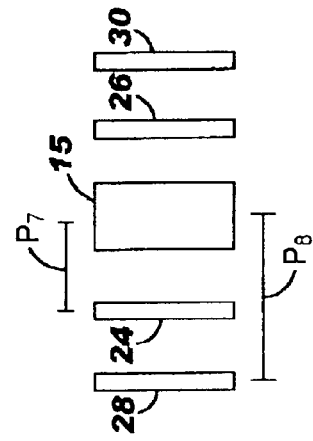
FIG. 2D illustrates an isolated feature of an integrated circuit layout including placement of subresolution assist features according to an iterative modeling method.
Figure 2C:
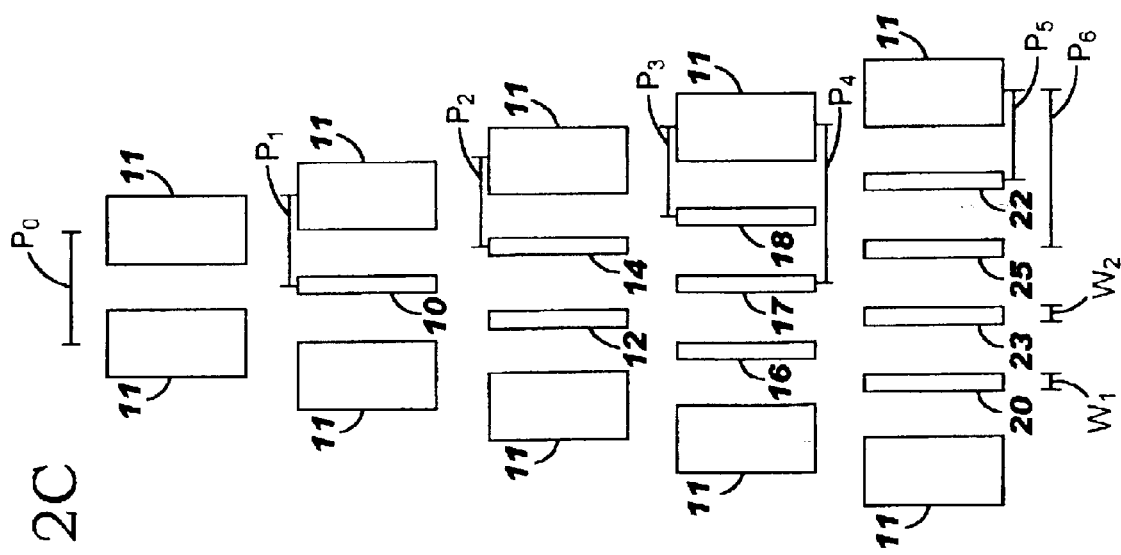
FIG. 2C illustrates a portion of a pattern of primary features of an integrated circuit layout, including placement of subresolution assist features according to an iterative modeling method.

To better understand the relationship between the critical pitch and the radial coordinates of an annular illumination source, consider a typical lithographic projection system 100, which includes an annular illumination source 110 for which the radial coordinates can be adjusted to have a minimum, or an inner, radial coordinate $\sigma_{inner}$, and a maximum, or outer, radial coordinate $\sigma_{outer}$, as illustrated in FIG. 1. Illumination is provided, typically at an essentially monochromatic wavelength λ from between the inner and outer radius of the annular source. A plane view of an annular illumination source 110 having inner radius $\sigma_{inner}$ and outer radius $\sigma_{outer}$ is illustrated in FIG. 1A.

The partial coherence of a lithographic projection system, $\sigma_{Max}$, is defined as the ratio of the numerical aperture $NA_{condenser}$ of the condenser lens 120, to the numerical aperture $NA_{projection}$ of the projection lens 150:

$$\sigma_{Max} = \left(\frac{NA_{condenser}}{NA_{projection}}\right). \tag{1a}$$

If $\alpha_{Max}$ is the maximum angle subtended by the illumination source 110, then:

$$\sin(\alpha_{Max}) = NA_{projection}, \tag{1b}$$

assuming that the refractive index of air is 1.

The maximum angle $\theta_{Max}$ subtended by the condenser lens 120 is limited by its numerical aperture, $NA_{condenser}$. Since the zeroth diffracted order is not affected by the mask grating 140, a ray projecting from the source through the condenser lens can subtend a maximum angle equal to the maximum angle subtended by the zeroth order, $\theta_{0Max}$, so that:

$$\sin(\theta_{0Max}) = NA_{condenser}. \tag{1c}$$

Therefore, $$\sin(\theta_{0Max}) = \sigma_{Max} \cdot NA_{projection}. \tag{1d}$$

Since the angle of propagation of the zeroth order emanating from the mask 140 due to a point source originating at some angle $\theta_{0x}$ can vary from 0 to $\theta_{0Max}$, the following expression will be satisfied:

$$\sin(\theta_{0x}) = \sigma_x \cdot NA_{projection}, \tag{1e}$$

in which $\sigma_x$ now represents the dimensionless radial coordinate of a point source projecting an angle between on-axis ($\theta_x=0$) to the maximum possible angle allowed by $NA_{condenser}$, which is $\theta_{0Max}$. Thus, Equation 1e defines a radial coordinate, $\sigma_x$, of possible point sources collectable by the condenser lens, derived from the partial coherence of the tool, $\sigma_{Max}$. Generally, the numerical aperture of a projection system refers only to $NA_{projection}$, thus, unless otherwise specified, NA will hereafter be used to refer to $NA_{projection}$. Equation 1e can be re-written simply as:

$$\sin(\theta_{0x}) = \sigma_x \cdot NA \tag{1f}$$

The angle that the $m^{th}$ diffracted order makes relative to the optical axis obeys the following relationship known commonly as Bragg's Law:

$$\sin(\theta_m) = \sin(\theta_0) - \frac{m\lambda}{P}, \quad (2)$$

where λ is the wavelength of the illumination, and P is the pitch of the mask pattern.

Off-axis illumination (OAI) can be used to shift the angle of propagation of the zeroth diffracted order in such a way that the propagation angle of the zeroth order is equal to that of the first diffracted order, and provide an infinite depth of focus (that is, there is no image degradation as the image suffers defocus). More specifically, assuming the diffracted order is k=1, then the conditions for insensitivity to defocus is given by:

$$\sin\theta_{-1} = -\sin\theta_0. \quad (3)$$

Equation 3 can be used to define a desirable relationship between an illumination source point located at radial position $\sigma_x$ and the pitch P of a linear grating:

$$P = \frac{\lambda}{2NA\sigma_x}, \quad (4)$$

for which defocus sensitivity will be minimized. Thus, for a given point source located at radial position $\sigma$hd x and the optimum placement of SRAFs would be at pitch P as defined in Equation 4.

This is only an idealization; in reality, the illuminator consists of a range of values of $\sigma_x$, and a deviation from perfect coherence will lead to a nominal degradation in depth of focus. Therefore, a range of pitches that provide good enough, and possibly optimal, lithographic process window corresponding to the range of $\sigma_x$ used in the illumination would be defined by:

$$[P_{\text{Min}}, P_{\text{Max}}] = \frac{\lambda}{2NA}\left[\frac{1}{\sigma_{outer}}, \frac{1}{\sigma_{inner}}\right], \quad (5)$$

where $\sigma_{outer}$ is the outer radius for annular illumination, and $\sigma_{inner}$ is the inner radius. Note that $P_{Min} < P_{Max}$, where $P_{Min}$ is the smallest pitch in the design layout which would print with optimal image characteristics (e.g. good image contrast, good depth of focus, good process window, etc.) using $\sigma_{outer}$, and $P_{Max}$ is the largest pitch for which SRAFs will be required, that is, the widest pitch for which inclusion of SRAFs will substantially improve the image characteristics (e.g. good image contrast, good depth of focus, good process window, etc.). Typically, $P_{Max}$, is chosen to be a pitch which exceeds the effective range of optical interaction, such as diffraction effects, diffusion in the resist, etc.

Of interest as well is an "optimal" pitch for the illumination condition. An "optimal" pitch would be optimally insensitive to a range of different values of σ, and would correspond to some average value of the illumination radius <σ>. For example, an a really weighted average value of σ would be nominally defined as:

$$\langle\sigma\rangle = \frac{\int_{\sigma_{inner}}^{\sigma_{outer}} \sigma d\sigma \int_0^{2\pi} \sigma d\phi}{\int_{\sigma_{inner}}^{\sigma_{outer}} \sigma d\sigma \int_0^{2\pi} d\phi}, \quad (6)$$

$$= \frac{\int_{\sigma_{inner}}^{\sigma_{outer}} \sigma^2 d\sigma}{\int_{\sigma_{inner}}^{\sigma_{outer}} \sigma d\sigma},$$

$$= \frac{2}{3}\frac{\sigma_{inner}^2 + \sigma_{inner}\sigma_{outer} + \sigma_{outer}^2}{\sigma_{inner} + \sigma_{outer}}.$$

Equation 6, however, assumes that all source points within a ring of equal σ have an equal effect upon the image. It turns out that this assumption is, in fact, false, and the steps below illustrate why, and what effect this has on the definition of "optimal."

Again, consider imaging through a lithographic system from a single, off-axis source point. The (scalar) electric field E at a point x on the wafer due to a single source point at position $\sigma=(\sigma_x, \sigma_y)$ is given by:

$$E(x,\sigma) = \int_{R^2} d^2u M(u-\sigma)\Psi(u)\exp\left(-i2\pi\frac{NA}{\lambda}u\cdot x\right), \quad (7)$$

where M represents the Fourier spectrum of the mask, u is a scaled spatial frequency coordinate whose magnitude $$|u| = \frac{\sin\theta}{NA},$$

and Ψ represents the pupil function which contains all information concerning defocus, aberrations, and cutoff frequencies. The pupil function Ψ has a standard form:

$$\Psi = \exp\left[i2\pi z u^2 \frac{NA^2/\lambda}{1+\sqrt{1-NA^2 u^{2-}}}\right]H(u), \quad (8)$$

where z is the amount of defocus, which is the distance of actual focal position from the point of best focus. $u=(u_x, u_y)$ is a coordinate inside the pupil, and is scaled so that the edge of the pupil is u=1, and H is a step function whose value is 1 when |u|<1, and 0 when |u|>1. The pupil function Ψ describes the impact of the lens on a plane wave having a direction, or spatial frequency, u. The pupil has finite extent, and in spatial frequency space, the pupil only extends out to |u|=1. Beyond that, where |u|>1, the pupil function Ψ is zero.

A cutoff condition can be defined as the largest angle, $\theta_{Max}$, accepted by the projection lens. The cutoff condition for this frequency scaling is given by:

$$|u|<1. \quad (9)$$

For a line/space pattern with pitch P, the mask function M has the following representation:

$$M(u-\sigma) = \sum_{m=-\infty}^{\infty} c_m \delta\left(u_x - \left(\sigma_x + \frac{m}{q}\right)\right)\delta(u_y - \sigma_y), \quad (10)$$

where $c_m$ is the amplitude of the $m^{th}$ diffracted order, and $$q = \left(\frac{P\cdot NA}{\lambda}\right).$$

The intensity of the field due to a source point at $\sigma=(\sigma_x, \sigma_y)$ is then:

$$|E(x,\sigma)|^2 = \left| \sum_{m=-\infty}^{\infty} c_m \Psi\left(\sigma_x + \frac{m}{q}, \sigma_y\right) \exp\left(-i2\pi \frac{NA}{\lambda} u \cdot x\right) \right|^2. \quad (11)$$

The cutoff condition (that is, $|u| \leq 1$) becomes:

$$|u|^2 = (u_x^2 + u_y^2) \quad (12)$$
$$= \left(\sigma \cos\phi + \frac{m}{q}\right)^2 + \sigma^2 \sin^2\phi \leq 1,$$

where $\phi$ is the azimuthal angle in the $\sigma$ plane, and $\sigma = |\sigma|$. Equation 12 contains the information about which diffracted orders, as a function of azimuth $\phi$ for a given value of $\sigma$, contribute to the image (that is, are accepted by the projection lens). In order to solve for order number m, the inequality of Equation 12 can be rearranged in order to provide this information more explicitly:

$$-\lfloor q(\sigma \cos\phi + \sqrt{1-\sigma^2 \sin^2\phi}) \rfloor \leq m \leq \lfloor q(-\sigma \cos\phi + \sqrt{1-\sigma^2 \sin^2\phi}) \rfloor, \quad (13)$$

where $\lfloor x \rfloor$ is the floor of x, which denotes the greatest integer less than x, where x is a real number. For example, if x=4.2, then $\lfloor x \rfloor$=4. However, if x=−3.1, then $\lfloor x \rfloor$=−4.

It turns out that, for the pitches under consideration, the quantity q takes on values less than unity. In this case, the analysis of the inequalities in Equation 13 becomes straightforward. If the leftmost quantity $-\lfloor q(\sigma \cos\phi + \sqrt{1-\sigma^2 \sin^2\phi}) \rfloor$ in Equation 13 is denoted as $N_-$ and the rightmost quantity $\lfloor q(-\sigma \cos\phi + \sqrt{1-\sigma^2 \sin^2\phi}) \rfloor$ as $N_+$, then, at azimuthal position $\phi = 0$, $$N_- = -\lfloor q(1+\sigma) \rfloor \text{ and } N_+ = \lfloor q(1-\sigma) \rfloor, \quad (14a)$$

and at azimuth $\phi = \pi/2$, $$N_- = -\lfloor q\sqrt{1-\sigma^2} \rfloor \quad N_+ = \lfloor q\sqrt{1-\sigma^2} \rfloor. \quad (14b)$$

Of the four diffracted order limits in Equations 14a and 14b, only the value of $N_-$ for the $\phi = 0$ case holds the possibility of being nonzero. That is, at $\phi = 0$, an image can form. However, under these conditions for $\phi = \pi/2$, an image will never form. Therefore, everything else being constant, for a given value of $\sigma$, the number of orders varies with azimuthal angle $\phi$.

In addition, there is also a unique angle for each value of $\sigma$, between $\phi = 0$ and $\phi = \pi/2$, designated as $\phi_0$, at which an image no longer forms. This angle is found by solving the following equation for $\phi_0$:

$$q(\sigma \cos\phi_0 + \sqrt{1-\sigma^2 \sin^2\phi_0}) = 1, \quad (15)$$

which comes from the expression for $N_-$ at an arbitrary azimuth. This leads to the following expression for $\phi_0$:

$$\phi_0(\sigma) = \cos^{-1}\left[\frac{1}{2}\left(\frac{1}{q} - q\right)\frac{1}{\sigma} + \frac{q}{2}\sigma\right]. \quad (16)$$

This expression for $\phi_0$ function (Equation 16) is 4-fold symmetric about the circle and defines a transition point for a weighting function based on image transfer efficiency, expressed in terms of the image modulation or the contrast transfer function. For incoherent illumination, image modulation is defined as the difference between the maximum $I_{Max}$ image intensity at the center of a bright feature and minimum $I_{Min}$ image intensity at the center of a dark featurescaled by the sum of those intensities, i.e., $$\left(\frac{I_{Max} - I_{Min}}{I_{Max} + I_{Min}}\right).$$

For coherent or partially coherent illumination, a contrast transfer function may be used to express image transfer efficiency. In accordance with the present invention, the a real weighted value of $\sigma$ is determined that favors image contributions with higher contrast. The average is computed over all the points for a given sigma value that produce an image with some modulation. All excluded angles have no modulation, and their inclusion in an image would only reduce the contrast. Thus, computing the weighted average of $\sigma$ (see Equation 6) only over values of $\sigma$ that produce an image, the following value of $\langle\sigma\rangle$ is obtained:

$$\langle\sigma\rangle = \frac{\int_{\sigma_{inner}}^{\sigma_{outer}} d\sigma \sigma^2 \cos^{-1}\left[a\sigma + \frac{b}{\sigma}\right]}{\int_{\sigma_{inner}}^{\sigma_{outer}} d\sigma \sigma \cos^{-1}\left[a\sigma + \frac{b}{\sigma}\right]}, \quad (17)$$

where $a = (1/q - q)/2$ and $b = q/2$. Recall that $q = P \cdot NA/\lambda$ and that $$P = \frac{\lambda}{2NA\sigma}$$

from Equation 4. The area-weighted average $\langle\sigma\rangle'$ can be obtained from Equation 17 using the relation $q = 1/(2\sigma)$:

$$\int_{\sigma_{inner}}^{\sigma_{outer}} d\sigma(\langle\sigma\rangle - \sigma)\sigma \cos^{-1}\left[\left(\langle\sigma\rangle - \frac{1}{4\langle\sigma\rangle}\right)\sigma + \frac{1}{4\langle\sigma\rangle\sigma}\right] = 0. \quad (18)$$

Equation 18 can be solved for $\langle\sigma\rangle$, the modulation-weighted a real average value of the radial coordinate $\sigma$ of an optimally configured annular illumination source. The value of pitch $\langle P \rangle$ that will be imaged with good depth of focus and with good contrast when imaged by an annular source having a radius equal to the weighted average value $\langle\sigma\rangle$ can be obtained by using Equation 4:

$$\langle P \rangle = \frac{\lambda}{2NA\langle\sigma\rangle}. \quad (19)$$

Thus, Equation 18 provides a relationship between an annular illumination source, having inner radius $\sigma_{inner}$ and outer radius $\sigma_{outer}$, and a design pitch for which this source provides optimal lithographic process conditions. Equation 18 has three unknown variables, namely $\sigma_{inner}$, $\sigma_{outer}$ and the weighted average $\langle\sigma\rangle$. If any two of these variables are known, the third can be determined by solving Equation 18. This relationship is used, in accordance with the present invention, to derive a rules table for placing SRAFs between critical features, as described in more detail below.

As discussed above, for a given IC design layout, even though there may be a wide range of pitches, it is typically possible to identify a critical pitch $P_{Crit}$ for which the image is to be optimized, for example, by providing optimal image contrast and depth of focus (e.g. an optimal process window). The modulation-weighted average radial coordinate corresponding to that critical pitch is given by:

$$\sigma_{Crit} = \frac{\lambda}{2NA \cdot P_{Crit}}. \quad (20)$$

The minimum pitch $P_{Min}$ of the IC design layout can also be identified, and the outer radial coordinate for the annular illumination source can then be obtained from:

$$\sigma_{outer} = \frac{\lambda}{2NA \cdot P_{Min}}. \quad (21)$$

Note that $P_{Crit} \geq P_{Min}$, but typically $P_{Crit} > P_{Min}$.

Thus, in accordance with the present invention, by specifying $\sigma_{Crit}$ the desired modulation-weighted average value $<\sigma>$, and given $\sigma_{outer}$ (which can be determined from the minimum pitch $P_{Min}$), Equation 18 can be solved for $\sigma_{inner}$. For example, Equation 18 can be solved numerically using techniques known in the art.

In summary, Equation 18 provides a relationship that can be used to determine an optimal range for annular illumination ($\sigma_{inner}$, $\sigma_{outer}$) that includes an optimal illumination for the critical pitch, and ensures that the full range of pitches in the final mask layout, including SRAFs, are imaged by an optimal (e.g. having good image contrast and depth of focus) annular illumination. Note that the corresponding optimal weighted-average radial coordinate $\sigma_{Crit}$ is encompassed within the inner and outer radial coordinates of the optimal annular source (see FIG. 1A).

The placement of SRAFs need not occur unless a pitch in the IC design layout is too large by some measurement threshold. For example, that threshold could be a minimum acceptable process window, a maximum depth of focus (e.g. <300 nm), a maximum exposure latitude (e.g. 5%) or some other measure. If the pitch is less than this "transition" pitch $P_{Trans}$, it is not necessary to include an SRAF. In a preferred embodiment, this transition pitch may be chosen to be the smaller of either about twice the critical pitch ($2P_{Crit}$) or the pitch corresponding to $\sigma_{inner}$ (which can be determined from Equation 4 above). This will ensure that all unassisted pitches are covered by the range of radial coordinates of the annular illumination source. As a practical matter, the mask design is also constrained by a so-called write grid, in which the mask design is manufactured by a mask writer tool that manufactures the mask in unit steps or a designated write "delta" $\Delta W$. Thus, in a preferred embodiment, the transition pitch $P_{Trans}$ is chosen to have a value that is the smaller of $$\frac{\lambda}{2NA\sigma_{inner}} \text{ and } (2P_{Crit} - \Delta W).$$

The application of SRAFs in a preferred embodiment of the present invention can be understood by reference to FIG. 3A, which illustrates a periodic pattern 300 (e.g. a grating) of repeating features 301 as part of an IC design layout. For convenience, only two of the repeating features 301 are shown, but typically there are more than two such features in a grating pattern. The pattern 300 has a design pitch $P_D$ in the direction of periodicity (e.g. the x-direction). If $P_D$ is greater than or equal to the transition pitch plus one write delta, i.e., if $P_D \geq (P_{Trans} + \Delta W)$, then one SRAF 710 will be placed midway between each of those features, at a distance $L_a$ as measured from the midpoint of a primary feature 301. That is, the SRAF 710 will be centered at a location defined by $L_a = 0.5P_D$. In this embodiment, only one SRAF will be needed as long as the design pitch $P_D$ is less than or equal to $(3P_{Crit} - \Delta W)$. The width $w_a$ of the SRAF is selected to be smaller than a threshold width that will print, but large enough to be manufacturable on the mask. The minimum SRAF width is determined by either the mask technology, or by the SRAF width which increases the depth of focus of the primary features at pitch $P_D$ (including SRAFs) to a number larger than the depth of focus of primary features at the same pitch $P_D$ without SRAFs. For example, a preferred embodiment for SRAF width $w_a$ is $0.2\lambda/NA$. Note that resulting pitch $P_{Combined}$ of the combined pattern (i.e., including both primary features and SRAFs) will have a value that substantially corresponds to the critical pitch $P_{Crit}$, although it may not be equal to the critical pitch. In this example, the combined pitch varies from $(P_{Trans} + \Delta W)/2$ to $(3P_{Crit} - \Delta W)/2$.

FIG. 3B illustrates a preferred embodiment of the present invention when the primary pitch $P_D$ is larger than or equal to $3P_{Crit}$. A pattern 300 of features 301 that repeat in the x-direction (only two of features 301 are shown for convenience) is illustrated where $4P_{Crit} \leq P_D \leq 5P_{Crit} - \Delta W$. In this case, three SRAFs are disposed between each of the primary features 301 in the IC design layout pattern 300. An SRAF (712 and 714) is positioned from the midpoint of each of the primary features 301, symmetrically, at a distance (i.e., $L_1$) equal to the critical pitch $P_{Crit}$. The third SRAF 711 is positioned at the midpoint between the two primary features 301, i.e. at a distance $L_2$ equal to $P_D/2$. Thus, the combined pitch $P_{Combined}$ is not uniform, but nonetheless, the modified pattern of primary features 301 plus SRAFs 712, 711 and 714 has a combined pitch that is substantially similar to the critical pitch and will tend to print with a process window that is substantially similar to the process window for a pattern having the critical pitch $P_{Crit}$.

In accordance with the present invention, once a critical pitch is chosen, optimal inner radius and outer radius for the annular illumination can be determined. In addition, a transition pitch is determined, which is the maximum pitch designated that does not require SRAFs. Then, if a periodic pattern is identified that has a design pitch that exceeds the transition pitch, at least one SRAF is added at a position midway between each of the primary (critical) features of the periodic pattern. Additional SRAFs are added between each of the design primary or critical features whenever the design pitch exceeds roughly an additional multiple of the critical pitch (within the resolution of a write grid). SRAFs are preferably positioned symmetrically at a distance equal to the critical pitch from each primary feature, and if there is an odd number of SRAFs, one SRAF will be located at a position midway between each of the primary features. FIG. 4 illustrates a table that summarizes how many SRAFs are added between each pair of primary feature patterns, in a preferred embodiment of the present invention. FIG. 5 illustrates another table that provides rules for symmetrically positioning the SRAFs relative to the midpoint of primary (critical) features of a periodic pattern. The SRAF positions $L_1, L_2, \ldots, L_p$ are symmetric from the midpoint of each of the primary critical features 301, depending on the total number N of SRAFs to be used. Typically, a maximum number (e.g. N=4) of SRAFs is all that is required. As discussed above, the width $w_a$ is preferably selected to be the largest width that will not print, but could be any width that will not print but is still manufacturable on the mask. Preferably, the SRAF with is chosen to be uniform across the mask, for example, having a value of $0.2\lambda/NA$, but the width of SRAFs could be chosen to vary in width.

The maximum design pitch $P_{Max}$ for which SRAFs are to be added is chosen to be a pitch that is effectively isolated. That is, when the pitch exceeds a maximum dimension, there is no discernable change in optical behavior as pitch increases. This maximum dimension can be thought of as a-maximum "optical interaction" distance, that is the distance beyond which optical interactions between neighboring features are not significant (e.g., optical proximity effects, etc.). In accordance with the present invention, a maximum design pitch $P_{Max}$ is chosen to be at least the maximum "optical interaction" distance, and is preferably larger (for example, about twice the "optical interaction" distance) to ensure that other interaction effects, such as resist diffusion effects, are accounted for and encompassed.

Features having nearest neighbor distances that exceed $P_{Max}$ are designated as "isolated" features. Referring to FIG. 6, in accordance with the present invention, for each isolated feature 601, an even number (e.g. N/2) of SRAFs 706 are disposed on opposing sides of the isolated feature 601, each spaced by the distance $P_{Crit}$, measured center-to-center from each other, as illustrated in FIG. 6. For typical applications, the number of SRAFs is preferably limited to N=4. As discussed previously, the width $w_a$ of each SRAF should be chosen narrow enough so that it will not print, but large enough to be manufacturable on the mask, and is preferably the largest that will not print.

The present invention provides SRAF configurations in a mask design layout that provide improved depth of focus and image contrast as compared to simpler methods of placing SRAFs, but take only seconds to generate, as compared to a more rigorous modeling method, which would typically require hours to generate.

FIG. 7 illustrates a flow chart of an embodiment of the inventive method for configuring SRAFs in a mask design. A desired design layout, such as for an integrated circuit pattern, is provided (Block 701). Also provided are other parameters (Block 702), including parameters describing a lithographic projection system capable of being configured to use an annular illumination source to be used with a mask designed to image and form the desired design layout on a semiconductor wafer, and also a write delta (or a write grid) which would be used by a mask writer tool to manufacture the mask. The design layout is then analyzed to identify a pattern having a critical pitch $P_{Crit}$, as for example when tight overlay tolerances with respect to an underlying pattern are required (Block 705). Also in Block 705, the corresponding optimal or modulation-weighted radial coordinate $\sigma_{Crit}$ which would image the critical pitch optimally (e.g. with optimal contrast and depth of focus), is then determined, for example, by using the Equation 19 relationship $$\sigma_{Crit} = \frac{\lambda}{2NA \cdot P_{Crit}}.$$

An inner radius and outer radius for the annular illumination is also determined for an annular illumination source configured optimally for the range of expected pitches in a modified design layout after SRAFs are included (Block 707). Preferably, this is done by selecting the outer radius $\sigma_{outer}$ to be based on the minimum pitch $P_{Min}$ in the design layout as in Equation 20. The inner radius $\sigma_{inner}$ should be selected so that the maximum pitch of the final modified layout including SRAFs is printed optimally (e.g. with optimal contrast and depth of focus). Preferably, $\sigma_{inner}$ is preferably determined by solving Equation 18 once $\sigma_{Crit}$ and $\sigma_{outer}$ are determined.

A transition pitch $P_{Trans}$ is chosen for identifying pitches in the design layout that will require SRAFs to be added in the mask layout. The transition pitch should be the maximum pitch that does not require SRAFs in order for the pattern to be printed with good contrast and depth of focus. Preferably, $P_{Trans}$ is selected to guarantee that all patterns having pitches without SRAFs (i.e. unassisted pitches) are covered by the illumination range of the annular source. For example, in a preferred embodiment, the transition pitch is chosen to be the smaller of $$\frac{\lambda}{2NA\sigma_{inner}}$$

and ($2P_{Crit}-\Delta W$). Then the design layout is analyzed to identify patterns of primary (critical) design features having a design pitch $P_D$ that is larger the transition pitch, and thus will have SRAFs added to the mask layout (Block 709). In a preferred embodiment, if $P_D \geq P_{Trans}+\Delta W$, then at least one SRAF will be added. Preferably, the number of SRAFs is determine in accordance with rules, such as those illustrated in FIG. 4. The placement of SRAFs between each of the primary features in the identified pattern having pitch $P_D$ is performed so that the resulting mask pattern modified by SRAFs have a combined pitch that substantially corresponds to $P_{Crit}$ (Block 711), which will ensure a good enough, and possibly optimal, image for the determined range of illumination. A preferred set of rules for placing the SRAFs is illustrated in FIG. 5. Isolated features can also be identified, and SRAFs placed to substantially match the critical pitch, as discussed above, and as illustrated in FIG. 6. The analysis of the design pattern continues (Block 713) to repeat the steps of Blocks 709 and 711 until all patterns and isolated features are identified, and then the mask design process can be continued as normal, for example, to clean up the design to meet manufacturability and other constraints.

The method in accordance with the present invention can be implemented in a computer system 800 as illustrated in FIG. 8. A computer program product including instructions and data for performing the method steps, for example, as outlined in FIG. 7, can be stored on a computer readable medium 810, such as a floppy disk, a compact disk, or a hard disk. The computer readable medium is readable by a central processing unit (CPU) 801, which has an input device 803 (e.g. a keyboard, mouse, or other input device), and an output device 805 (such as a display monitor, printer, or other output device), through which input parameters (such as illumination wavelength, mask write delta and initial IC design layout) can be provided to the system. The computer system may also have a connection 813 to other computer systems or devices, tools, or networks, etc., through which data and instructions (such as the modified mask layout that includes SRAFs) can be exchanged between the computer system 800 and other systems, tools, devices or networks.

While the invention has been particularly shown and described with respect to preferred embodiments thereof, it will be understood by those skilled in the art that the foregoing and other changes in form and details may be made therein without departing from the spirit and scope of the invention.

What is claimed is:

1. A method of manufacturing an integrated circuit (IC) comprising the steps of:

providing system parameters of a lithographic projection system having an annular illumination source, said system parameters including a projection numerical aperture NA, and a wavelength $\lambda$, an inner radius $\sigma_{inner}$ and an outer radius $\sigma_{outer}$ of said annular illumination source;

providing an IC design layout including a plurality of first critical features arranged in a pattern having a critical pitch $P_{Crit}$, wherein said critical pitch is greater than or equal to a minimum pitch $P_{Min}$ of the design layout and less than a maximum pitch $P_{Max}$ of the design layout;

determining a critical radius $\sigma_{Crit}$ that provides an optimal lithographic process window corresponding to said critical pitch;

determining said outer radius and said inner radius of the annular illumination source so that said critical radius is greater than or equal to said inner radius and less than or equal to said outer radius;

determining a transition pitch $P_{Trans}$ chosen as a maximum pitch for which sub-resolution assist features (SRAFs) need not be added;

identifying a plurality of second critical features within the design layout having a design pitch $P_D$ that is larger than said transition pitch $P_{Trans}$;

disposing one or more SRAFs within said IC design layout between each of said second critical features to form a modified IC design layout including a final combined pattern of SRAFs and said second critical features having a combined pitch $P_{Combined}$, wherein said combined pitch substantially corresponds to said critical pitch; and designing a mask layout for use with said lithographic projection system, wherein said mask layout corresponds to said modified IC design layout including said final combined pattern of said one or more SRAFs and said second critical features.

2. The method of claim 1 wherein said maximum pitch $P_{Max}$ is selected to be a widest pitch for which inclusion of SRAFs will substantially improve the optimal lithographic process window.

3. The method of claim 1 wherein said outer radius $\sigma_{outer}$ is determined according to the equation $$\sigma_{outer} = \frac{\lambda}{2NA P_{Min}}.$$

4. The method of claim 1 further comprising determining said outer radius $\sigma_{outer}$ according to the equation $$\sigma_{outer} = \frac{\lambda}{2NA P_{Min}},$$

determining a critical radius $\sigma_{Crit}$ corresponding to said critical pitch $P_{Crit}$ according to the equation $$\sigma_{Crit} = \frac{\lambda}{2NA P_{Crit}},$$

and then determining said inner radius $\sigma_{inner}$ by solving the equation $$\int_{\sigma_{inner}}^{\sigma_{outer}} d\sigma (\sigma_{Crit} - \sigma)\sigma \cos^{-1}\left[\left(\sigma_{Crit} - \frac{1}{4\sigma_{Crit}}\right)\sigma + \frac{1}{4\sigma_{Crit}\sigma}\right] = 0.$$

5. The method of claim 4 wherein said determining said inner radius $\sigma_{inner}$ further comprises numerical integration.

6. The method of claim 1 further providing a write delta $\Delta W$ for a mask writer tool and determining said transition pitch $P_{Trans}$ to have a value that is the smaller of $$\frac{\lambda}{2NA \sigma_{inner}}$$

and $(2P_{Crit} - \Delta W)$.

7. The method of claim 1 further comprising providing a write delta $\Delta W$ for a mask writer tool, and wherein said design pitch $P_D$ is larger than the sum of the transition pitch $P_{Trans}$ and the write resolution $(P_{Trans} + \Delta W)$, and wherein said disposing one or more SRAFs further comprises disposing one SRAF between each of the second critical features if the design pitch $P_D$ has a value $(P_{Trans} + \Delta W) \leq P_D \leq (3P_{Crit} - \Delta W)$, or disposing 2 or more SRAFs between each of the second critical features where the number of SRAFs N satisfies the relation $(N+1)P_{Crit} \leq P_D \leq [(N+2)P_{Crit} - \Delta W]$ if said design pitch $P_D$ has a value greater than or equal to $3P_{Crit}$ and less than or equal to the maximum pitch $P_{Max}$.

8. The method of claim 7 further comprising forming a mask in accordance with said mask layout using said mask writer tool having said write delta $\Delta W$.

9. The method of claim 1 wherein each of said one or more SRAFs in said mask layout has an SRAF width at least as wide as a minimum manufacturable width and less than a width that will print using said lithographic projection system.

10. A method of manufacturing an integrated circuit (IC) comprising the steps of:

providing system parameters of a lithographic projection system having an annular illumination source, said system parameters including a projection numerical aperture NA, and a wavelength $\lambda$, an inner radius $\sigma_{inner}$ and an outer radius $\sigma_{outer}$ of said annular illumination source;

providing a write delta $\Delta W$ of a mask writer tool;

Providing an IC design layout including a plurality of first critical features arranged in a pattern having a critical pitch $P_{Crit}$, wherein the critical pitch is greater than or equal to a minimum pitch $P_{Min}$ of the design layout and less than a maximum pitch $P_{Max}$ of the design layout at which optical interaction is significant;

determining the outer radius $\sigma_{outer}$ according to the equation $$\sigma_{outer} = \frac{\lambda}{2NA P_{Min}};$$

determining a critical radius $\sigma_{Crit}$ corresponding to the critical pitch $P_{Crit}$ according to the equation $$\sigma_{Crit} = \frac{\lambda}{2NA P_{Crit}};$$

determining the inner radius $\sigma_{inner}$ by solving the equation $$\int_{\sigma_{inner}}^{\sigma_{outer}} d\sigma (\sigma_{Crit} - \sigma)\sigma \cos^{-1}\left[\left(\sigma_{Crit} - \frac{1}{4\sigma_{Crit}}\right)\sigma + \frac{1}{4\sigma_{Crit}\sigma}\right] = 0;$$

determining a transition pitch $P_{Trans}$ having a value that is the smaller of $$\frac{\lambda}{2NA\sigma_{inner}}$$

and $(2P_{Crit}-\Delta W)$, wherein said transition pitch is the greatest pitch for which subresolution assist features (SRAFs) are not required;

identifying a plurality of second critical features within the design layout having a design pitch $P_D$ that is greater than or equal to the transition pitch plus the write delta $(P_{Trans}+\Delta W)$;

disposing one or more SRAFs within said IC design layout between each of said second critical features, wherein one SRAF is disposed between each of the second critical features if the design pitch $P_D$ has a value $(P_{Trans}+\Delta W) \leq P_D \leq (3P_{Crit}-\Delta W)$, or a number of SRAFs N greater than or equal to two are disposed between each of the second critical features where N satisfies the relation $(N+1)P_{Crit} \leq P_D \leq [(N+2)P_{Crit} - \Delta W]$ if the design pitch $P_D$ has a value greater than or equal to $3P_{Crit}$ and less than or equal to said maximum pitch $P_{Max}$, to form a modified IC design layout including a final combined pattern of SRAFs and said second critical features having a combined pitch $P_{Combined}$, wherein said combined pitch substantially corresponds to said critical pitch; and designing a mask layout of a mask in accordance with said modified IC design layout, said mask for use with a lithographic projection system having said system parameters, and said mask to be formed using a mask writer tool having said write delta.

11. A computer program product comprising:

a computer usable medium having computer readable program code means embodied therein for causing a computer to determine a configuration of subresolution assist features (SRAFs) in a mask manufacturing an integrated circuit (IC) design layout, the computer readable program code means in said computer program product comprising:

computer readable program code means for causing a computer to store parameters of a lithographic projection system, said parameters including a projection numerical aperture NA and a wavelength $\lambda$ of an annular illumination source, the annular illumination source having radial dimensions ranging from an inner radius $\sigma_{inner}$ to an outer radius $\sigma_{outer}$;

computer readable program code means for causing a computer to store a critical pitch $P_{Crit}$ of a first pattern of critical features, a minimum pitch $P_{Min}$ and a maximum pitch $P_{Max}$ of patterns in an IC design layout, wherein said critical pitch $P_{Crit}$ is greater than or equal to a minimum pitch $P_{Min}$ of the IC design layout and less than a maximum pitch $P_{Max}$ of the IC design layout;

computer readable program code means for causing a computer to determine said outer radius $\sigma_{outer}$ and said inner radius $\sigma_{inner}$ of the annular illumination source wherein so that a critical radius $\sigma_{Crit}$ has a value $\sigma_{inner} \leq \sigma_{Crit} \leq \sigma_{outer}$, wherein $\sigma_{Crit}$ provides an optimal image for patterns having said critical pitch $P_{Crit}$;

computer readable program code means for causing a computer to store a transition pitch $P_{Trans}$ larger than said critical pitch $P_{Crit}$;

computer readable program code means for causing a computer to identify a second pattern of second critical features within the IC design layout having a design pitch $P_D$ that is larger than said transition pitch $P_{Trans}$;

computer readable program code means for causing a computer to dispose one or more SRAFs between each of said second critical features to form a modified IC design layout including a final combined pattern of SRAFs and said second critical features, said final combined pattern having a combined pitch $P_{Combined}$, wherein said combined pitch $P_{Combined}$ substantially corresponds to $P_{Crit}$; and computer readable program code means for causing a computer to design a mask, layout for manufacturing a mask for use with said lithographic projection system including said annular illumination source having said inner radius $\sigma_{inner}$ and said outer radius $\sigma_{outer}$, wherein said mask layout corresponds to said modified IC design layout including said final combined pattern of said one or more SRAFs and said second critical features.

12. The computer program product of claim 11 wherein said maximum pitch $P_{Max}$ is selected to be a widest pitch for which inclusion of SRAFs will substantially improve the image characteristics.

13. The computer program product of claim 11 wherein said outer radius $\sigma_{outer}$ is determined according to the equation $$\sigma_{outer} = \frac{\lambda}{2NAP_{Min}}.$$

14. The computer program product of claim 11 further comprising computer readable program code means for causing a computer to determine said outer radius $\sigma_{outer}$ according to the equation $$\sigma_{outer} = \frac{\lambda}{2NAP_{Min}},$$

causing a computer to determine said critical radius $\sigma_{Crit}$ according to the equation $$\sigma_{Crit} = \frac{\lambda}{2NAP_{Crit}}$$

and then causing a computer to determine said inner radius $\sigma_{inner}$ by solving the equation $$\int_{\sigma_{inner}}^{\sigma_{outer}} d\sigma(\sigma_{Crit}-\sigma)\sigma\cos^{-1}\left[\left(\sigma_{Crit}-\frac{1}{4\sigma_{Crit}}\right)\sigma+\frac{1}{4\sigma_{Crit}\sigma}\right] = 0.$$

15. The computer program product of claim 14 wherein said causing a computer to determine said inner radius $\sigma_{inner}$ further comprises numerical integration of the equation $$\int_{\sigma_{inner}}^{\sigma_{outer}} d\sigma(\sigma_{Crit}-\sigma)\sigma\cos^{-1}\left[\left(\sigma_{Crit}-\frac{1}{4\sigma_{Crit}}\right)\sigma+\frac{1}{4\sigma_{Crit}\sigma}\right] = 0.$$

16. The computer program product of claim 11 further comprising computer readable program code means for causing a computer to store a write delta $\Delta W$ of a mask writer tool and to assign said transition pitch $P_{Trans}$ to a value that is the smaller of $$\frac{\lambda}{2NA\sigma_{inner}}$$

and $(2P_{Crit}-\Delta W)$.

17. The computer program product of claim 11 further comprising computer readable program code means for causing a computer to store a write delta $\Delta W$ of a mask writer tool and wherein said design pitch $P_D$ is larger than the sum of the transition pitch $P_{Trans}$ and the write resolution $(P_{Trans}+\Delta W)$, and wherein said causing a computer to dispose one or more SRAFs further comprises disposing one SRAF between each of the second critical features if the design pitch $P_D$ has a value $(P_{Trans}+\Delta W) \leq P_D \leq (3P_{Crit}-\Delta W)$, or disposing 2 or more SRAFs between each of the second critical features where the number of SRAFs N satisfies the relation $(N+1)P_{Crit} \leq P_D \leq [(N+2)P_{Crit}-\Delta W]$ if said design pitch $P_D$ has a value greater than or equal to $3P_{Crit}$ and less than or equal to the maximum pitch $P_{Max}$.

18. The computer program product of claim 11 wherein each of said one or more SRAFs in said mask layout has an SRAF width at least as wide as a minimum manufacturable width and less than a width that will print using said lithographic projection system.

19. A computer program product comprising:

a computer usable medium having computer readable program code means embodied therein for causing a computer to determine a configuration of subresolution assist features (SRAFs) in a mask manufacturing an integrated circuit (IC) design layout, the computer readable program code means in said computer program product comprising:

computer readable program code means for causing a computer to store parameters of a lithographic projection system, said parameters including a projection numerical aperture NA and a wavelength $\lambda$ of an annular illumination source, the annular illumination source having radial dimensions ranging from an inner radius $\sigma_{inner}$ to an outer radius $\sigma_{outer}$;

computer readable program code means for causing a computer to store a write delta $\Delta W$ of a mask writer tool;

computer readable program code means for causing a computer to store an IC design layout including a plurality of first critical features arranged in a pattern having a critical pitch $P_{Crit}$, wherein the critical pitch $P_{Crit}$ is greater than or equal to a minimum pitch $P_{Min}$ of the IC design layout and less than a maximum pitch $P_{Max}$ of the IC design layout;

computer readable program code means for causing a computer to determine the outer radius $\sigma_{outer}$ according to the equation $$\sigma_{outer} = \frac{\lambda}{2NAP_{Min}};$$

computer readable program code means for causing a computer to determine a critical radius $\sigma_{Crit}$ corresponding to the critical pitch $P_{Crit}$ according to the equation $$\sigma_{Crit} = \frac{\lambda}{2NAP_{Crit}};$$

computer readable program code means for causing a computer to determine the inner radius $\sigma_{inner}$ by solving the equation $$\int_{\sigma_{inner}}^{\sigma_{outer}} d\sigma(\sigma_{Crit}-\sigma)\sigma\cos^{-1}\left[\left(\sigma_{Crit}-\frac{1}{4\sigma_{Crit}}\right)\sigma + \frac{1}{4\sigma_{Crit}\sigma}\right] = 0;$$

computer readable program code means for causing a computer to determine a transition pitch $P_{Trans}$ having a value that is the smaller of $$\frac{\lambda}{2NA\sigma_{inner}}$$

and $(2P_{Crit}-\Delta W)$;

computer readable program code means for causing a computer to identify a plurality of second critical features within the design layout having a design pitch $P_D$ that is larger than the sum of the transition pitch and the write resolution $(P_{Trans}+\Delta W)$;

computer readable program code means for causing a computer to dispose one SRAF between each of said plurality of second critical features if said design pitch $P_D$ has a value $(P_{Trans}+\Delta W) \leq P_D \leq (3P_{Crit}-\Delta W)$, or causing a computer to dispose 2 or more SRAFs between each of the second critical features, where the number of SRAFs N satisfies the relation $(N+1)P_{Crit} \leq P_D \leq [(N+2)P_{Crit}-\Delta W]$, if the design pitch $P_D$ has a value greater than or equal to $3P_{Crit}$ and less than or equal to the maximum pitch $P_{Max}$.

20. The computer program product of claim 19 wherein said causing a computer to determine the inner radius $\sigma_{inner}$ further comprises numerical integration of the equation $$\int_{\sigma_{inner}}^{\sigma_{outer}} d\sigma(\sigma_{Crit}-\sigma)\sigma\cos^{-1}\left[\left(\sigma_{Crit}-\frac{1}{4\sigma_{Crit}}\right)\sigma + \frac{1}{4\sigma_{Crit}\sigma}\right] = 0.$$

* * * * *